Feb. 18, 1941.　　O. C. GILMORE　　2,232,322
TELEVISION TUBE
Filed Oct. 5, 1939

Inventor
Otto C. Gilmore
By Stevens and Davis
Attorney

Patented Feb. 18, 1941

2,232,322

UNITED STATES PATENT OFFICE 2,232,322

TELEVISION TUBE

Otto C. Gilmore, Van Nuys, Calif., assignor to Cosmocolor Corporation, New York, N. Y., a corporation of Delaware Application October 5, 1939, Serial No. 298,124

1 Claim. (Cl. 250—164)

This invention relates to television apparatus and more particularly to cathode-ray tubes used in such apparatus.

One of the chief difficulties in television is the distortion of the televised image. This distortion may be due to various reasons such as fluctuations of the electric impulses, variations in the surfaces of the scanning screens and numerous other reasons. One of the contributing factors to this distortion is the differential dispersion and refraction caused by the passage of the image rays through the walls of the cathode-ray tubes to and from the scanning screens. These tubes are usually provided with ordinary glass bulb housings and the conditions of the glass may vary somewhat and cause differentiations in the dispersion and refraction of the light rays.

It is an object of the present invention to overcome the last mentioned difficulty and to prevent distorting dispersion and refraction which may be caused by the passage of the light rays through the walls of the cathode-ray tubes. This invention contemplates a cathode-ray tube structure which is highly efficient and commercially practical both as to methods of production and the cost of the product.

Briefly, the present invention comprises an ordinary cathode-ray tube made from ordinary glass in the usual manner, in which the section of the tube wall through which the light rays pass is removed and a corresponding section of optical glass is fused into the wall of the tube. This invention may be practiced with all types of cathode-ray tubes such as the iconoscope for initially taking and sending the image and the kinescope for receiving the televised image and reproducing the visible light image. By the use of optical glass the differential dispersion and refraction is reduced to a minimum and in view of the fact that this optical glass window is fused directly into the wall of the tube, the tubes are as efficient as when originally constructed. Any desirable type of optical glass may be used and the particular type may be chosen according to the conditions it will encounter.

The invention both as to its organization and method of operation, together with additional objects and advantages thereof, will best be understood from the following description of the specific embodiments when read in connection with the accompanying drawing wherein like reference characters indicate like parts throughout.

Figure 1:
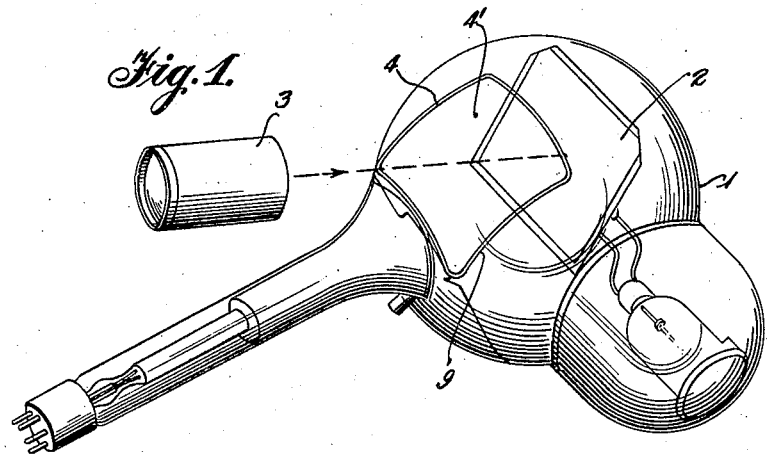
Fig. 1 is a view in perspective of an iconoscope embodying the present invention.

With specific reference to the drawing, Fig. 1 shows a well known type of the iconoscope 1, having a photo-electric screen 2 therein which is adapted to initially receive the optical image which is to be televised. The optical image is usually projected by an objective 3 through a section of the wall of the tube 1, onto the photoelectric screen 2. According to the present invention this section 4 of the original wall is removed from the tube 1 and a window 4' comprising optical glass of substantially the same contours and dimensions is inserted in place. As considerable difficulty might be encountered if it were attempted to secure the optical glass window 4' in position by mechanical means, due to the fact that a vacuum must be maintained within the tube, it has been found that these difficulties can be surmounted by fusing the edges of the window 4' directly to the edges of the opening cut in the tube 1.

Figure 2:
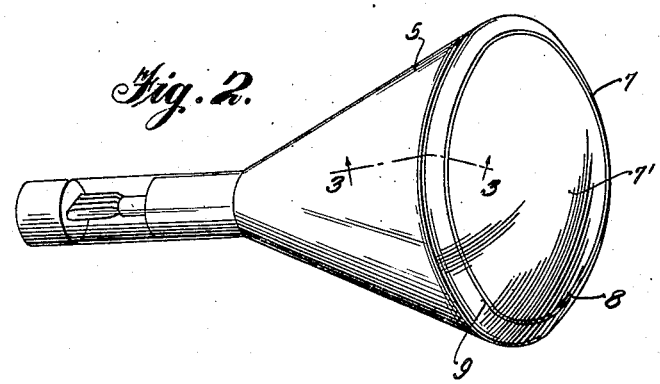
Fig. 2 is a view in perspective of a kinescope embodying the present invention.
Figure 3:
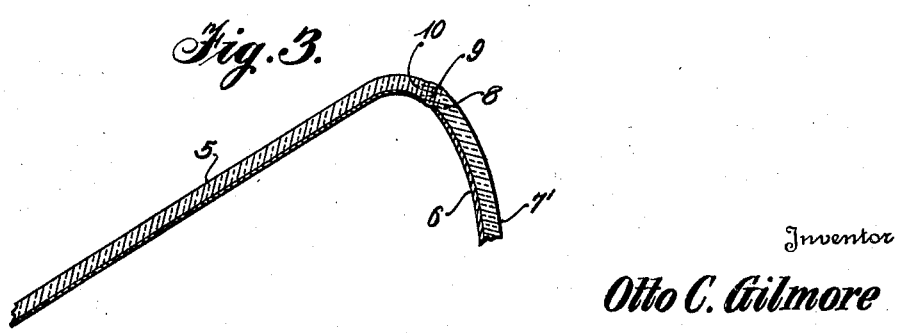
Fig. 3 is an enlarged view in cross-section taken on the lines 3—3 of Fig. 2.

As may be seen in Figs. 2 and 3, the same procedure may be followed in the manufacture of the kinescope type of tube. Fig. 2 shows a typical kinescope tube 5 wherein the electrons bearing the televised image are bombarded upon a fluorescent screen 6 located within the tube 5. The fluorescent screen 6 may be coated on or mounted adjacent to the front surface 7 of the tube. The fluorescent screen 6 is shown in Fig. 3 as being coated directly upon the inner surface of the front face 7 of the tube 5 but any well known structure may be employed. The image produced by the fluorescent screen 6 may be viewed directly through the face 7 of the tube 5 or may be projected in a well known manner to a screen. Accordingly, it is desirable to provide the whole face 7 of optical glass so as to eliminate differential dispersion and diffusion.

As best seen in Fig. 3 the front face 7 of the tube 5 may be removed and a corresponding section 7' comprising optical glass may be inserted in its place. The edges 8 of the optical glass section 7' may then be fused in any desired manner as indicated at 9, directly to the edges 10 of the tube 5 produced by removing the face 7 of the tube. In this manner the window 7' is firmly secured in place and the tube may be definitely sealed so that the necessary vacuum may be produced when the tube is completely constructed. The fluorescent screen 6 may, of course, be applied to the window 7' after said window has been incorporated into the wall of the tube 5. Whereas the fusion of the window has been completely illustrated with respect to the kinescope it is understood that the same holds good for the iconoscope or any other type of tube, the object being to provide optical glass wherever it is necessary for light image rays to pass through the wall of the tube.

It is contemplated that this optical glass window should substantially coincide with the formation of the tube in which it is to be located, although said window may be flattened if desired. Likewise, this fused optical glass window may also be curved to form a lens, either positive or negative, so that an image, if desired, can be formed or controlled by either type of tube. It is desired to reduce dispersion and refraction to a minimum and consequently the window should be such as to form the least possible interference and have the least possible effect upon the light rays passing therethrough. The glass used may comprise any of the known types of optical glass such as the various crown and flint glasses which have long been in use and those which have been more recently developed, including the various types of Jena glass, and heat resistant glass such as "Pyrex." The particular type of glass used may be selected according to the properties of the individual type and the conditions to which it will eventually be subjected.

Although certain specific embodiments of the present invention have been shown and described, many modifications thereof may be possible, and the present disclosure should be construed only in an illustrative sense. The present invention, therefore, is not to be restricted except insofar as it is necessitated by the prior art and the spirit of the appended claim.

I claim:

A television tube comprising a glass housing and containing a screen adapted to register an image thereon and means for scanning said screen with an electronic beam, said housing having an opening in a wall thereof which is in optical alignment with said screen, and a lens comprising optical glass positioned within the opening of said housing and focused upon said screen, said optical glass having a heat resistance at least equal to that of the housing, the adjoining edges of said opening and said lens being integrally fused together to completely seal the housing.

OTTO C. GILMORE.